United States Patent [19]
James

[11] Patent Number: 5,548,461
[45] Date of Patent: Aug. 20, 1996

[54] ARC SUPPRESSOR

[75] Inventor: Jesse C. James, Huntsville, Ala.

[73] Assignee: McDonnell Douglas Corporation, Huntington Beach, Calif.

[21] Appl. No.: 318,442

[22] Filed: Oct. 5, 1994

Related U.S. Application Data

[63] Continuation-in-part of Ser. No. 273,576, Jul. 11, 1994.
[51] Int. Cl.⁶ ........................................... H01H 9/30
[52] U.S. Cl. ........................................... 361/13; 361/2
[58] Field of Search ........................... 361/2, 3, 5, 8, 361/13, 14, 6, 56; 340/638, 641, 650

[56] References Cited

U.S. PATENT DOCUMENTS

| | | | |
|---|---|---|---|
| 4,685,018 | 8/1987 | Tada et al. | 361/1 |
| 4,745,511 | 5/1988 | Kugelman et al. | 361/8 |
| 4,878,144 | 10/1989 | Nebon | 361/2 |

Primary Examiner—Jeffrey A. Gaffin
Assistant Examiner—Ronald W. Leja
Attorney, Agent, or Firm—Ronald M. Goldman; Ronald L. Taylor

[57] ABSTRACT

Placed in electrical circuit in shunt of the electrodes that supply current to a protected device and optically coupled to the location in the protected device where an electric arc is most likely to occur, a photosensitive device, responsive to illumination created by such an electric arc, switches to a conductive state, thereby short circuiting the electrodes feeding current to the arc and the arc is quickly extinguished.

14 Claims, 1 Drawing Sheet

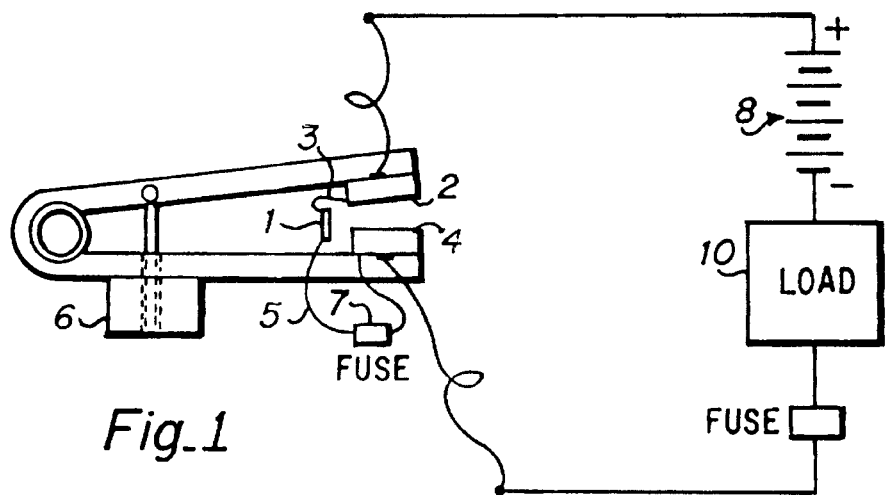
Fig._1
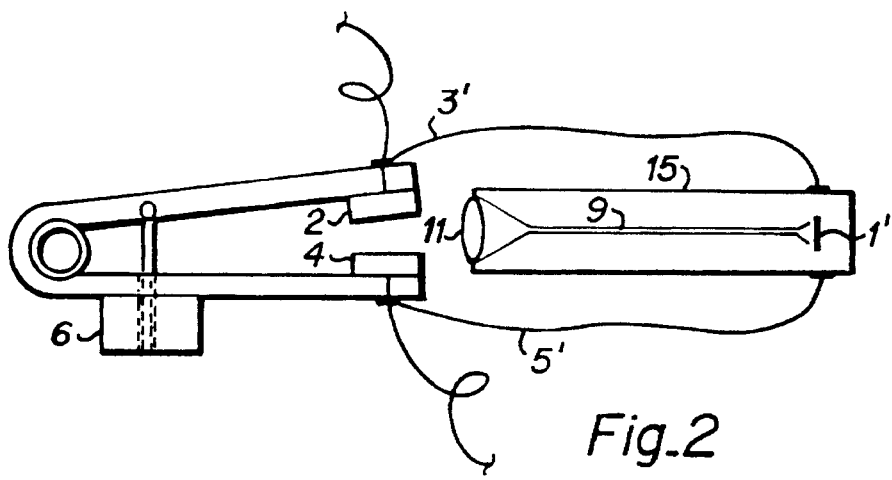
Fig._2
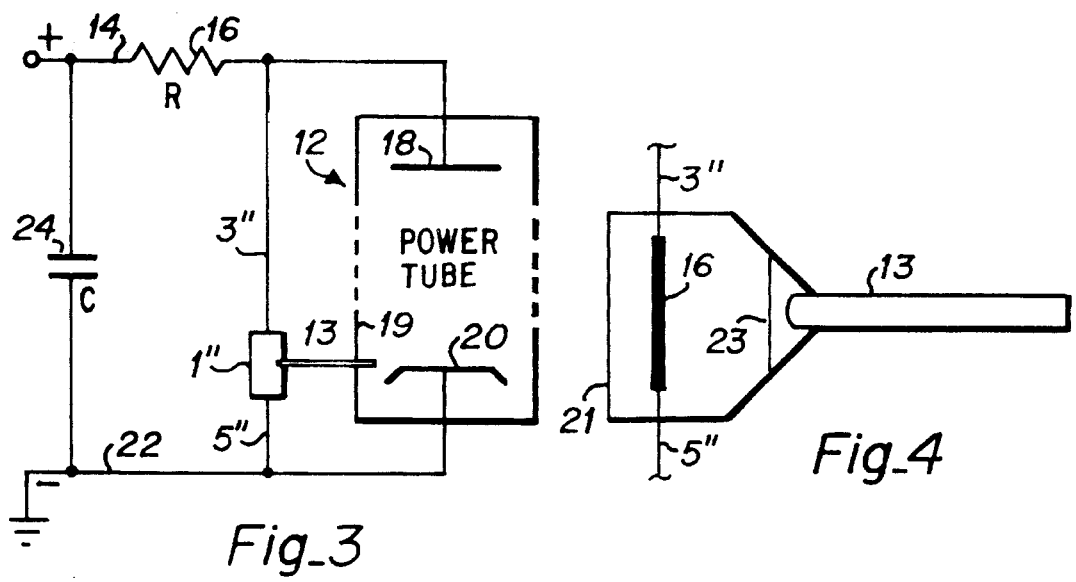
Fig._3
Fig._4

5,548,461

ARC SUPPRESSOR

This application is a continuation in part of my earlier filed application Ser. No. 08/273,576 filed Jul. 11, 1994, entitled Synthetic Aperture Radar Smearing, herewith, for which the benefit of 35 U.S.C. 120 is claimed.

FIELD OF THE INVENTION

This invention relates to electric arc suppressors and, more particularly, to apparatus for extinguishing undesired electric arcs as may typically form between switching contacts used to interrupt current in a circuit and between the electrodes found within high power vacuum tubes.

BACKGROUND

Relays and circuit breakers are known devices that contain electrical contacts, switching contacts, that are normally spaced apart and are thereby electrically isolated from one another by the ambient air or other insulating environment, but which may be moved into contact to provide direct electrical contact. In application those switching contacts are wired into electric circuits, so that the circuit is completed when the relay or circuit breaker is operated. When a relay or electric circuit breaker, closes, its switching contacts are moved into direct physical contact with one another, completing a current conducting path in such electric circuit. Electric current flows through the contacts in that electric circuit between the power source and the load. When the relay or breaker opens, the contacts move and separate, interrupting the electrical current.

Initially, one expects that the physical separation of the contacts immediately interrupts the current as intended. However, under some circumstances an electric arc occurs between those contacts. As example, when the electrical potential between the relay's contacts is sufficiently high and the contact spacing very small, as is the situation when the contacts commence separation, the potential difference breaks down the air and bridges the small space or gap between the contacts, drawing the arc, which thereby allows continuance of some level of current through the contacts, and, hence through the electric circuit.

In most applications, the arc is almost indiscernible, insignificant and/or quickly extinguishes. In other applications such as those involving inductive loads or high voltages and high currents, arcing is significant. As is known, energy released by the arc pits and slowly destroys the switching contacts.

In the past, various means have been used to extinguish those unwanted arcs. One such means for relays and circuit breakers was to incorporate an inductive "blow out coil". The coil creates a magnetic field that immerses the arc. Through interaction with the magnetic field, the familiar ev X B relationship described in the physics literature, the arc lengthens and moves out in a kind of motor action that is familiar to those skilled in the art.

Electric arcs also sometimes occur in electron tubes or vacuum tubes, as variously termed, especially in high power electron tubes. In electron tube operation high voltages are applied between metal elements, electrodes. Those electrodes, such as the tube's plate and cathode electrodes, are spaced apart in a vacuum environment in which they are housed. Should the applied voltage temporarily exceed the breakdown potential between two elements, an arc over occurs. Sometimes an arc is caused by "whiskers" that grow on electrodes or by small amounts of gas released from the electrodes. A small arc may burn off a whisker, but can quickly destroy those elements, heating the elements to temperatures at which they melt or evaporate, which renders the tube inoperative.

As a general observation and with either device, if physical conditions are such that creation of an arc from time to time is unavoidable, the greater the duration of the arc, the greater damage the arc causes. Conversely, the shorter in duration of the arc, then less damage is experienced.

An object of the present invention therefore is to extinguish arcs more quickly than the prior protective devices, thereby minimizing damage. Indirectly, the present invention, thus, improves and lengthens the service lifetime of switching contacts in relays, circuit breakers and vacuum tubes, an ancillary object to the invention.

A further object of the invention is to provide an efficient arc suppressor that is smaller in size than and which can be produced at lesser cost than prior arc suppressors.

SUMMARY OF THE INVENTION

In accordance with the invention, a photosensitive device is placed in electrical circuit across the electrodes that supply current to the protected device and is optically coupled to the location in the protected device where an electric arc is most likely to occur. In response to illumination created by any such arc, the photosensitive device, normally non-conducting, switches to a conductive state, thereby short circuiting the electrodes feeding current to the arc. The arc is quickly extinguished. With the arc extinguished, the photosensitive device quickly returns to the non-conductive state, a standby mode, awaiting occurrence of a further arc.

Modern photosensors can switch their conductivity state very quickly, on the order of two nanoseconds. It should be appreciated that with such rapid response, the damage accruing from arcing is more limited than with the prior arc suppression devices.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

BRIEF DESCRIPTION OF THE DRAWINGS

In the Drawings:

FIG. 1 is a pictorial illustration of a circuit breaker constructed according to the invention containing the novel arc suppressor;

FIG. 2 is a pictorial illustration of a second embodiment of the arc suppressor invention;

FIG. 3 is a schematic illustration of an electron tube and arc suppressor combination constructed according to the invention; and FIG. 4 is a more detailed pictorial illustration of the arc suppressor used in the embodiment of FIG. 3.

DESCRIPTION OF THE PREFERRED EMBODIMENTS

Reference is made to FIG. 1 which pictorially illustrates a conventional relay or circuit breaker contacts 2 and 4, carried by arms mounted to a pivot point and a control or driver for the contacts, generally indicated by block 6. Contacts 2 and 4 are formed of a metal that is electrically conductive, such as silver or copper. Though the relay contacts are normally spaced apart or "open" as is conventional in such relays, one of the contacts pivots in response to operation of the driver 6, such as an electromagnetic coil and pivots into physical contact with the other, whereby, the contacts are said to be "closed".

A photoconductor 1, which serves as the arc suppressor, is positioned near contacts 2 and 4. Electrical lead 3 connects one end of photoconductor 1 to contact 2 and a second electrical lead 5 connects the other end of photoconductor 1 in circuit with the other switching contact in series with a current sensitive fuse 7, thereby forming a circuit in shunt of contacts 2 and 4.

Preferably the photoconductor is chosen to be sensitive only to light in the ultraviolet range, as example, Gallium nitrite, which is not sensitive to the longer wavelengths. When the photoconductor is sensitive to visible light, it is normally encased within an optical filter that passes ultraviolet while absorbing the visible light. The photoconductor is optically coupled to contact 4 and is normally electrically non-conductive. Hence any illumination at contact 4, suitably of ultraviolet wavelength or shorter wavelength, results in the photoconductor switching its conductive state from the nonconductive state in which it is normally placed absent the appropriate illumination, to the electrically conductive state, and remains in that state, so long as it remains illuminated.

Conventionally, the relay contacts are placed in an electrical current conducting circuit, which is generally represented in the figure by battery 8 and electrical load 10 that are wired in series circuit to the respective contacts, and either carry or interrupt current, as appropriate, when the contacts are respectively closed or open. Control 6 is energized or not by conventional means, not illustrated. In the normal operation in which it is desired to supply current to load 10, control 6 moves contact 2 into physical contact with contact 4 and current from source 8 is supplied therethrough to electrical load 10. When it is desired to disconnect the load, the controller moves contact 2 back toward its space position. In so doing, an arc is apt to form between the contacts if the supply voltage is high enough. Such an arc bridges the space between the contacts and continues to pass some current between the contacts to the load. As the contacts move apart, the voltage difference between the contacts is sometimes sufficient to break down or ionize the ambient air, normally an insulator, separating the contacts and the arc forms. That arc creates light at contact 4, suitably light in the ultraviolet wavelength range.

That physical separation is small when the contact starts its movement, and increases over a short interval until the contact is restored to its full open position. Should such an arc be generated it usually will self extinguish after the contacts have moved apart to the normal spaced position. Nonetheless, during the short duration, the arc causes some surface pitting of the relay contacts. As arcing is repeated, and pitting accumulates, the relay contacts will become high in resistance. Eventually the contacts become so pitted that they will not conduct current and require replacement.

Photosensitive material has the property of being a conductor when illuminated by light of the proper wavelength and being a dielectric when in the dark. Typically, a photosensitive material is sensitive to all wavelengths shorter than a given wavelength, and is not at all sensitive to longer wavelengths. Gallium nitrite for example, is sensitive only to wavelengths shorter than about 370 nm, which is in the near ultraviolet range. Photoconductive polymers can be synthesized that are sensitive to various wavelengths of light. It is also fast acting. Some photoconductors switch between states in as little as two nanoseconds.

Exposed to such illumination the photoconductor rapidly switches into its conducting state, creating a low resistance shunt current path around contacts 2 and 4. By diverting current from the breaker contacts and along a path parallel to that across the gap between the contacts, insufficient current remains to sustain the arc and the arc quickly extinguishes. Extinguishing the arc also removes the source of light from the photoconductor 1 and the photoconductor returns to its non-conductive state opening the shunt current path. At this time, the contacts 2 and 4, which continued to move further apart during the interim, are spaced far enough apart, that the potential difference between the contacts is insufficient to ionize the surrounding air and re-ignite the arc.

As viewed by a spectrograph, the arc radiates illumination at the spectral emission lines characteristic of the relay contact material, such as silver or copper. Both those materials produce characteristic emission lines in the near ultraviolet range. In alternative embodiments of the invention, to ensure that a selected photosensitive material is sensitive to arcs in a given circuit breaker, a small amount of an element that radiates strongly at the wavelength to which the semiconductor is sensitive, may be incorporated into the breaker's contacts, the photosensor being matched to the contact material's spectral lines.

As example, a small amount of a metal, such as iron, which is rich in ultraviolet emission lines could be incorporated into or alloyed with the contact surfaces to enhance the performance for some photoconductors and some contact materials, while only slightly increasing the contact resistance due to the small amount of added material.

Optical color filters can be employed in the arc suppressor to filter the wavelength of light that is incident on the photosensor. By so doing there is a wider choice of photosensitive materials that may be used. Gallium arsenide, thallium indium sulfide, lead sulfide, silicon germanium alloys and light sensitive conducting polymers are materials having photosensitive properties useful in photosensors. These are but a few examples of photoconductors that may be used in the combination, separately or in combination with optical color filters.

Fuse 7 is a slow blowing type that is rated at less current than the circuit normally draws. The fuse protects the circuit and the photosensor in the unlikely event that an extraneous source of ultraviolet light is nearby exposing the photoconductor and causing it to conduct current for longer periods than normal.

An alternate embodiment of the arc suppressor is illustrated pictorially in FIG. 2 to which reference is made. For convenience, where an element appears in this figure that is the same as that appearing in an earlier figure, the same numerical denomination that was used to earlier identify the element is used in the succeeding figures and that numeral is primed. In the embodiment of FIG. 2, the photoconductor 1' is located at the distant end of a light guide 9. Lens 11 is located at the front end of that light guide and focuses light received into the front end of the light guide for propagation to the photoconductor 1'. The lens, light guide and photoconductor are housed in a light tight container or housing 15, whose internal walls are painted black, so as to prevent extraneous light from reaching the light guide or photoconductor. As in the prior embodiment, electrical leads 3' and 5' are connected respectively, to switching contacts 2 and 4. Housing 15 is mounted by suitable mounting brackets, not illustrated, so that the input side of lens 11 is focused at contact 4, the location at which the ultraviolet light first appears should an arc be formed.

This embodiment functions in the same manner as that of FIG. 1, except that the photoconductor is located at a remote position. It may be more convenient to attach lead 3' and 5' to a different location in the circuit than as shown, but which provides a shunt path for current, diverting current from the switching contacts. As example, in the circuit diagram of FIG. 1, leads 3' and 5' may be placed across the series circuit formed by battery 8 and load 10.

An arc suppressor according to the invention provides protection also for high power transmitter tubes, including klystrons, traveling wave tubes, magnetrons, and triodes, serving as the "crowbar" protector for those electron vacuum tubes. The exact structure of each of those known electron tubes is not necessary to an understanding of the present invention and thus need not be described specifically herein. In general, however, electron tubes include electrodes such as a plate and a cathode positioned in spaced relationship within a vacuum envelope in which those elements are confined. The cathode is formed of electron emissive material. Typically in operation the cathode is heated by an electrical filament to ensure proper emissivity. With a high voltage power source applied between the plate and cathode and the cathode electrically heated high enough so that, typically, a red glow is visible, in normal operation electrons traverse the vacuum region to the plate under control of one or more additional control electrodes or grids, thereby providing a current path through the electron tube and some of the cited electron tubes, consume electrical power, and thus function also as an electrical load.

An arc that develops in such tubes can very quickly destroy the cathode and grids. Unless extinguished more quickly the arc renders the tube non-functional, destroying the expensive tube. To prevent that destructive course of events, crowbar circuits are usually included, external of the electron tube. Typically the crowbar includes a sensor in the cathode circuit that triggers an air gap or an ignitron tube or a solid state switch that in turn short circuits the high voltage applied across the tube, thereby extinguishing the arc. That short circuit creates a large current surge in the power supply circuit. A circuit breaker in the power supply circuit quickly detects the current surge and interrupts the power supply, thereby withdrawing the high voltage from the tube and crowbar circuit.

Present crowbar circuits typically require a period of several microseconds to extinguish the arc. The arc suppressor presented herein extinguishes the arc in appreciably less time than three microseconds, which is faster than such existing crowbar circuits. Since the present arc suppressor conducts current only during the existance of the arc, and does not require any standby power it is less demanding on the associated power supply. This is in contrast to an ignitron tube which continues to conduct current until all electrical charge on the power supply capacitor, C, as shown in FIG. 3, is dissipated.

As illustrated schematically in FIG. 3, a conventional electron tube 12 is illustrated in circuit with a power supply, not illustrated, that supplies high voltage from the positive polarity terminal over lead 14 through a series connected resistor 16 to plate electrode 18 of the vacuum tube. The plate and cathode are housed within a vacuum envelope, generally indicated as 19, and the internal region is in vacuum. The circuit to the power supply is completed from cathode 20 via lead 22 to the negative or ground polarity of the power supply. As is conventional in such operating circuits, a large value storage capacitor 24 is connected across the power supply.

Arc suppressor 1" has its leads 3" and 5" connected in the circuit, respectively, with the plate and cathode of the tube, providing a shunt current path shunting the tube, when the arc suppressor is switched into the conducting state. In this embodiment the arc suppressor includes a light guide 13 that preferably extends through the tube's outer envelope into the vacuum region within the tube with right hand end facing the surface of cathode 20, the location where light is likely to be generated should an arc occur during the tube's normal operation.

The preferred construction of the arc suppressor is pictorially illustrated in FIG. 4 to which reference is made. The photosensor may be a wafer of photosensitive material 1b that has the characteristic of being sensitive only to ultraviolet light. The photosensor is mounted by conventional means, not illustrated, in a light tight box or housing 21. Insulated electrical leads 3" and 5" extend from the housing to the position in circuit illustrated in the preceding figure. The box tapers in geometry toward the front end leaving a small cylindrical opening which snugly receives an end of light guide 13. An optical filter 23 is located in the housing intermediate the light guide and photosensor. The filter filters out the characteristic red glow normally present at the electron tube's cathode in normal operation, allowing only the shorter wavelengths to propagate from the light guide to photosensor 1b. Although such cathode glow contains some ultraviolet emissions they are very weak and insignificant and, thus, would not be detected by the photosensor. The optical filter is unnecessary and may be omitted, should gallium nitrite be selected as the photosensitive material as that material is sensitive only to ultraviolet and shorter wavelengths.

Alternatively light guide 13 may be constructed in several pieces that are optically coupled together by suitable optical couplers. Portions of the light guide may be embedded in a vacuum tight relationship with the wall of the vacuum envelope. That portion of the light guide which is positioned in the vacuum region is formed of glass material that is suitable for use within vacuum tubes. That is, the material should not emit foreign particles that would settle upon and contaminate the cathode, does not outgass as would adversely effect the vacuum of the internal region and should withstand the high temperatures in those regions. The portion of the light guide resident external to the vacuum region may be constructed to more modest requirements and is therefore less expensive.

It is appreciated that the photosensor senses illumination created by an arc in circumstances in which an arc is not desired and is essentially a random event. The photosensor is placed in a circuit to extinguish that arc after which the photosensor remains in a standby condition awaiting another arc as may occur at random. Were the arc to be generated repeatedly, indicative of some more serious problem within the protected circuit, one might observe a flashing light, as the arc is constantly formed and extinguished in the described manner, essentially forming a flashing lamp circuit. In such a situation, unless suitable protection circuits are employed or unless the photosensor is designed to withstand the extra heating as would be caused by the extra current that passes therethrough in a given period of time and the extra power dissipated as heat by the photosensor, the photosensor would ultimately be destroyed. Although one might not desire to mis-use the circuit breaker and/or electron tube for that purpose, the physical phenomenon is noted. Such a phenomenon has been applied in a practical flashing lamp arrangement, either as part of an arc lamp and/or gas lamp circuit, that is described in my prior application Ser. No. 08/273,576 filed Jul. 11, 1994, copending herewith.

More specifically a conventional electrical gas type arc lamp is employed in such a flashing lamp circuit. In the arc lamp, light is produced and emanates from the arc in the gap between spaced electrodes located within a gas chamber. A power supply connected across the lamp terminals supplies electrical power for the arc. By placing a photoconductor in a circuit that shunts the arc lamp, as described in the foregoing electron tube apparatus, and optically coupling the photoconductor to the arc, suitably by positioning the photoconductor in proximity to the lamp's glass envelope, light produced in the arc is incident on the photoconductor.

When the light generated by the arc reaches a sufficient magnitude or intensity, the photoconductor, normally in a non-conducting state, becomes conductive. It then shunts electrical power from the arc, lowering the voltage applied across the lamp. The lamp voltage then falls below the minimum voltage necessary for sustaining the electrical arc, thereby causing the arc to extinguish.

As soon as the arc extinguishes, the photoconductor returns to its non-conductive state and electrical power is again available to permit creation of the light producing arc. Since the arc lamp requires application of a minimum predetermined voltage for a specified interval before it again ignites and emits light there is a delay before light is again emitted by the lamp. The foregoing cycle repeats periodically and results in a pulsating light source. As is apparent the foregoing is a form of relaxation oscillator circuit. The rate of light pulsing is determined by various factors including the gas mixture in the chamber, the characteristics of the photoconductor, and the battery or power supply voltage.

It is believed that the foregoing description of the preferred embodiments of the invention is sufficient in detail to enable one skilled in the art to make and use the invention. However, it is expressly understood that the detail of the elements presented for the foregoing purposes is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. An improved protective circuit for an electrical device supplied with electrical power from an electric source, said electrical device producing an electric arc, and said electric arc emitting radiant energy, and arc suppressing means for extinguishing said electric arc, the improvement wherein said arc suppressing means comprises:

photoconductor means, said photoconductor means being optically coupled to said electrical device for receiving radiant energy produced by said arc, said photoconductor means, normally being in an electrical non-conductive state, and being placed in an electrically conductive state in response to illumination from said arc; and circuit means connecting said photoconductor means in shunt of said electric device, whereby, upon detection of light generated by said arc, electrical power is diverted from said electrical device to extinguish said arc.

2. An arc suppressor for electric switching apparatus, said switching apparatus having first and second operational states, said switching apparatus having at least one pair of electrical switching contacts, normally spaced apart, and wherein one of said electrical switching contacts is moved into physical contact with the other switching contact for completing an electrical current conducting circuit, responsive to said switching apparatus being in said first operational state, and for separating said contacts to a spaced relationship to interrupt said electrical conducting circuit, responsive to said switching apparatus being in said second operational state, said switching apparatus being subject to formation of an illumination producing electrical arc that bridges the space between said at least one pair of said switching contacts as said contacts separate in response to said switching apparatus being placed from said first operational state into said second operational state, with the current for said illumination producing electrical arc being supplied from said electrical current conducting circuit, comprising:

photoconductor means, said photoconductor means having a normal electrically non-conductive state, responsive to the absence of illumination and having an electrically conductive state during exposure to illumination;

said photoconductor means being connected electrically in shunt of said at least one pair of switching contacts for bypassing current supplied by said current conducting circuit around said at least one pair of electrical switching contacts during exposure of said photoconductor means to illumination; and said photoconductor means being optically coupled to said at least one pair of switching contacts, whereby any electric arc generated upon separation of said switching contacts in said at least one pair of electrical switching contacts produces illumination and said illumination is coupled to said photoconductor means, wherein said photoconductor means is placed in an electrically conductive state to divert electric current from said at least one pair of electrical switching contacts and, thereby, extinguish said electric arc.

3. The invention as defined in claim 2, including first and second electrical lead means connected, respectively, to a first and second contact of said at least one pair of electrical switching contacts; at least said first lead means supporting said photoconductor means in a position adjacent to and in light conducting relationship with one of said contacts, said first electric lead means being movable with said one of said switching contacts.

4. The invention as defined in claim 3, further including fuse means, said fuse means being connected in series circuit with one of said electrical lead means for interrupting current through said photoconductor means, responsive to current exceeding a predetermined level.

5. The invention as defined in claim 2, further comprising:
   lens means;
   light guide means having first and second ends defining an optical path between said ends, said lens means being positioned at one end of said light guide means for focusing light received by said lens means into said light guide means;
   said lens means having an input side focused upon said at least one pair of electrical switching contacts, whereby light generated by an arc formed at said at least one pair of switching contacts is propagated through said light guide means to the opposite end thereof; and wherein said photoconductor means is positioned at said second end of said light guide means for receiving said light propagating therethrough.

6. The invention as defined in claim 5, further comprising:

light box means for housing at least said lens means and said light guide means for preventing extraneous light from entering into said light guide means through other than said lens means.

7. The invention as defined in claim 2 wherein said photoconductor means comprises gallium nitrite.

8. The invention as defined in claim 2 wherein said photoconductor means comprises a material selected from the group consisting of gallium nitrite, gallium arsenide, thallium indium sulfide, lead sulfide, silicon germanium alloy, a solid state photoconductor, and light sensitive conducting polymers.

9. An arc suppressor for a high voltage vacuum tube, said vacuum tube having at least one pair of electrode elements mounted in spaced relationship within a confined region in vacuum, power circuit means for supplying high voltage across said electrode elements, said vacuum tube providing a current conducting path from said power circuit means through said electrode elements, said vacuum tube being subject to formation of an illumination producing electrical arc bridging the space between said electrode elements during the application of said high voltage across said electrode elements to produce illumination at one of said electrode elements with the current for said arc being supplied from said power circuit means, comprising:

photoconductor means, said photoconductor means having a normal electrically non-conductive state when not exposed to arc produced illumination and having an electrical conductive state during exposure to arc produced illumination;

said photoconductor means being connected electrically in shunt of said vacuum tube electrode elements, external of said vacuum tube, for completing an electric circuit therethrough to divert current supplied by said power circuit means through said photoconductor means and away from said electrode elements only during exposure of said photoconductor means to arc produced illumination; and said photoconductor means being optically coupled to said one electrode elements of said at least one pair of electrode elements, whereby any electric arc within said vacuum tube bridging the space between said electrode elements produces illumination and said illumination is coupled to said photoconductor means, wherein said photoconductor means is placed in an electrically conductive state to divert current from said electrode elements and, thereby, extinguish said arc.

10. The invention as defined in claim 9, further comprising: light guide means for optically coupling said photoconductor means to said one electrode element of said at lease one pair of electrode elements, said light guide means optically extending into said confined region, said light guide means having one end directed at said one electrode element for coupling arc produced illumination therefrom into said light guide means and an opposed end for propagating any such illumination from said light guide means to said photoconductor means for exposing said photoconductor means to such illumination.

11. The invention as defined in claim 10, further including: optical filter means, said optical filter means being located intermediate said photoconductor means and said opposed end of said light guide means for filtering out unwanted light of a predetermined range of wavelengths.

12. The invention as defined in claim 10, wherein said photoconductor means comprises gallium nitrite.

13. The invention as defined in claim 10, wherein said photoconductor means comprises a material selected from the group consisting of gallium nitrite, gallium arsenide, thallium indium sulfide, lead sulfide, silicon germanium alloy, a solid state photoconductor and light sensitive conducting polymers.

14. The invention as defined in claim 9, wherein said photoconductor means comprises a material selected from the group consisting of gallium nitrite, gallium arsenide, thallium indium sulfide, lead sulfide, silicon germanium alloy, a solid state photoconductor and light sensitive conducting polymers.

* * * * *